United States Patent
Nakashima et al.

(10) Patent No.: US 6,435,542 B2
(45) Date of Patent: Aug. 20, 2002

(54) AIRBAG APPARATUS FOR FRONT PASSENGER SEAT

(75) Inventors: Yoshiharu Nakashima; Mitsuo Yasuda, both of Fukumitsu-machi (JP)

(73) Assignee: Sanko Gosei Kabushiki Kaisha, Toyama-ken (JP)

(*) Notice: Subject to any disclaimer, the term of this patent is extended or adjusted under 35 U.S.C. 154(b) by 0 days.

(21) Appl. No.: 09/847,550

(22) Filed: May 2, 2001

(30) Foreign Application Priority Data

May 12, 2000 (JP) ........................................ 2000-140509
May 19, 2000 (JP) ........................................ 2000-147652

(51) Int. Cl.[7] .............................................. B60R 21/20
(52) U.S. Cl. ................................................. 280/728.3
(58) Field of Search ............................ 280/728.3, 731, 280/732

(56) References Cited

U.S. PATENT DOCUMENTS

| | | | |
|---|---|---|---|
| 4,148,503 A | 4/1979 | Shiratori et al. | ............ 280/731 |
| 5,183,288 A | * 2/1993 | Inada et al. | |
| 5,411,288 A | * 5/1995 | Steffens | |
| 5,569,959 A | * 10/1996 | Cooper et al. | |
| 5,685,560 A | 11/1997 | Sugiyama et al. | ........... 280/731 |
| 5,839,752 A | 11/1998 | Yamasaki et al. | ......... 280/728.3 |
| 6,070,901 A | 6/2000 | Hazell et al. | ............. 280/728.3 |
| 6,089,642 A | 7/2000 | Davis, Jr. et al. | ............. 296/70 |
| 6,299,198 B1 | * 10/2001 | Nakashima et al. | ..... 280/728.3 |

FOREIGN PATENT DOCUMENTS

| | | |
|---|---|---|
| JP | 406144142 A | 5/1994 |
| JP | 7-172256 | 7/1995 |
| JP | 11-198752 | 7/1999 |
| JP | 2001-206180 | 7/2001 |

* cited by examiner

Primary Examiner—Anne Marie Boehler
Assistant Examiner—Faye M. Fleming
(74) Attorney, Agent, or Firm—Ladas & Parry

(57) ABSTRACT

An airbag apparatus for a front passenger seat includes a fracture-opening section which is defined in an interior cover and is split into front and rear subsections upon inflation of an airbag, and front and rear reinforcement plate members fixedly attached to back surfaces of the front and rear subsections. Upper bent portions and lower bent portions are alternately formed at predetermined intervals at each of the mutually-opposed end portions of the front and rear reinforcement plate members such that a vertical step is formed between the upper bent portions and the lower bent portions. A projection tongue having an engagement hole is provided at the tip end of each upper bent portion. A projection engageable with the engagement hole is formed on the upper face of each lower bent portion. The mutually-opposed end portions of the front and rear reinforcement plate members are superposed and engaged with each other in such a manner that the projection tongues are located above the lower bent portions.

3 Claims, 6 Drawing Sheets

AIRBAG APPARATUS FOR FRONT PASSENGER SEAT

BACKGROUND OF THE INVENTION

1. Field of the Invention

The present invention relates to an airbag apparatus for a front passenger seat for protecting a passenger sitting in the front passenger seat upon collision of a vehicle, such as a car, to thereby ensure safety of the passenger. More particularly, the invention relates to a reinforcement structure for a fracture-opening section which is formed in an instrument panel cover (hereinafter referred to as an "interior cover") in opposition to an airbag and which breaks so as to allow unfolding and expansion of the airbag.

2. Description of the Related Art

An airbag apparatus for a front passenger seat of a vehicle, such as a car, basically includes an airbag, an airbag case for accommodating the folded airbag, and an inflater for inflating the airbag. In addition, such an airbag apparatus includes a closure plate which is attached to an opening which is formed in an interior cover in opposition to an opening portion of the airbag case, or a fracture-opening section which is formed in the interior cover and which fractures from a fragile portion so as to separate from the interior cover.

Generally, the instrument panel of an automobile consists of an instrument panel core formed from a synthetic resin, such as polypropylene, and an interior cover, which covers the instrument panel core and is formed of a synthetic resin, such as polypropylene.

Japanese Patent Application Laid-Open (kokai) No. 7-172256 discloses an airbag apparatus for a front passenger seat in which an opening is formed in an interior cover, and a closure plate is attached to the opening. Further, in Japanese Patent Application 11-117972, the assignee of the present application has proposed an airbag apparatus for a front passenger seat which has a fracture-opening section formed in an interior cover. Specifically, through application of a laser beam, a fragile contour portion and a fragile center splitting portion are formed to thereby define the fracture-opening section, such that the fracture-opening section can be divided into first and second subsections. First and second reinforcement plate members are fixedly attached to back surfaces of the first and second subsections. Each of the first and second reinforcement plate members has a hinge portion and a bent leg portion. The leg portions of the first and second reinforcement plate members are engaged with hooks fixed to the front and rear walls of an opening portion of an airbag case. Upon inflation of the airbag, the contour portion and the center splitting portion are broken, so that the fracture-opening section opens apart from the interior cover.

Figure 1:
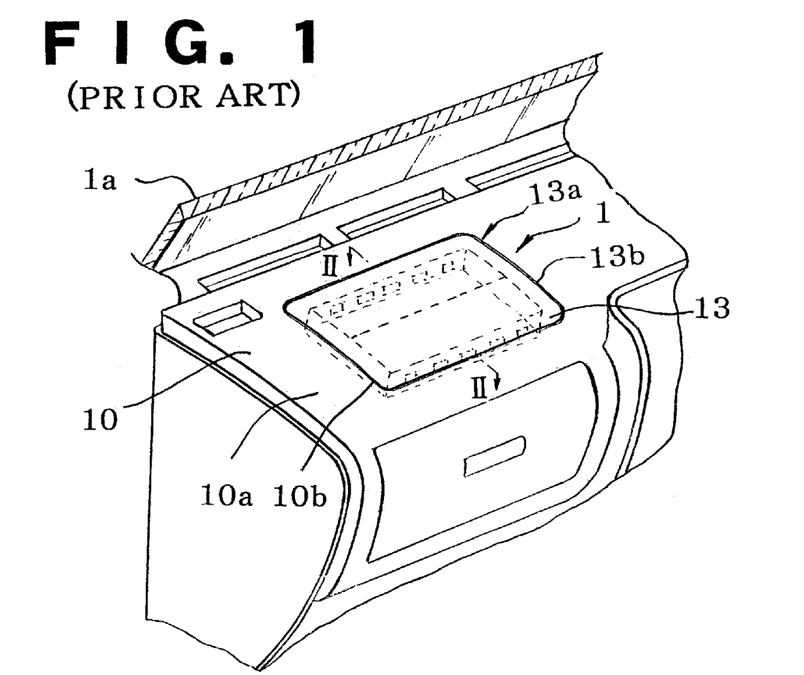
FIG. 1 is a perspective view of a conventional airbag apparatus having an opening portion which is formed in an interior cover for allowing an inflating airbag to project outward therethrough.

FIG. 1 shows a former conventional airbag apparatus for a front passenger seat. The airbag apparatus for a front passenger seat is disposed under a horizontal plane 10a of an interior cover 10 located in the vicinity of a windshield 1a of a vehicle. The airbag apparatus includes an airbag case 12 having an opening portion 12a formed in opposition to the back surface of the interior cover 10. An airbag 11 is accommodated within the airbag case 12 in a folded state, and is inflated by means of gas from an inflater. An opening lid 13 formed of a flexible synthetic resin is disposed at an opening portion 10b formed on the interior cover 10 in opposition to the opening portion 12a of the airbag case 12. Upon inflation of the airbag 11, grooves 13a and 13b—which are formed along the centerline of and along the periphery of the opening lid 13 and serve as fragile portions—are broken, so that the opening lid 13 is split into two fracture pieces, which open apart in opposite directions toward the front and rear of the vehicle, respectively. The inflating airbag 11 projects outward through the thus-formed opening.

Figure 2:
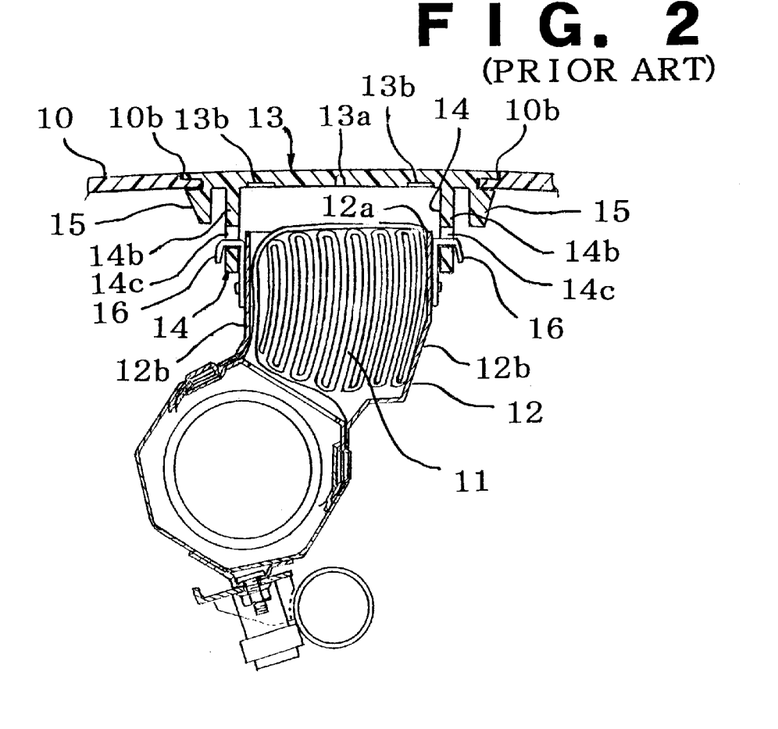
FIG. 2 is a vertical sectional view taken along line II—II of FIG. 1.

A mounting leg portion 14 and a plurality of engagement pieces 15 are integrally formed on the back surface of the opening lid 13. The mounting leg portion 14 assumes the form of a rectangular frame slightly greater in size than the opening portion 12a of the airbag case 12. The engagement pieces 15 are elastically engaged with the edge of the opening portion 10b of the interior cover 10. A plurality of rectangular through-holes 14c are formed in front and rear walls 14b of the mounting leg portion 14. When the opening lid 13 is fitted to the opening portion 10b of the interior cover 10, the rectangular through-holes 14c are engaged with corresponding hooks 16 fixed to front and rear walls 12b of the opening portion 12a of the airbag case 12 and to a rear wall 12b of the opening portion 12a of the airbag case 12.

When the airbag 11 inflates, through fracture along the grooves 13a and 13b formed along the centerline of and along the periphery of the opening lid 13, the opening lid 13 is split into two fracture pieces, which open apart in opposite directions toward the front and rear of the vehicle, respectively. Since the rectangular through-holes 14c formed in the front and rear walls 14b of the mounting leg portion 14 are engaged with the hooks 16 of the airbag case 12, scattering of the fracture pieces of the opening lid 13 is prevented.

Figure 3A:
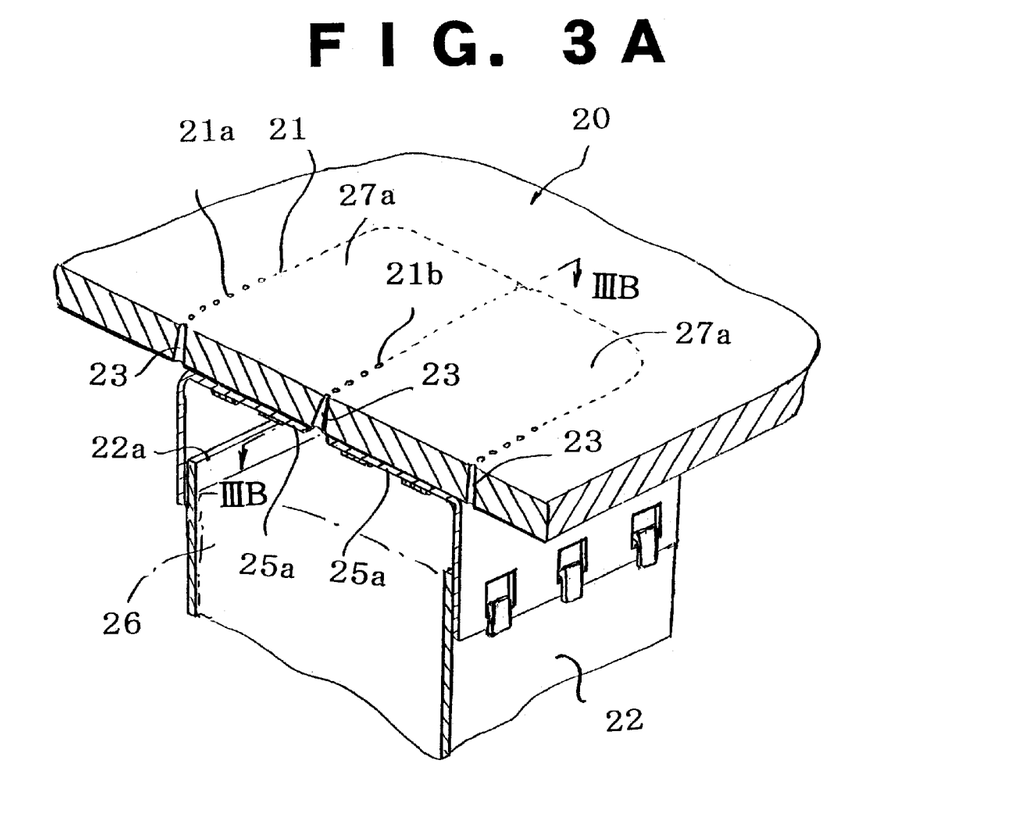
FIG. 3A is a perspective view.
Figure 3B:
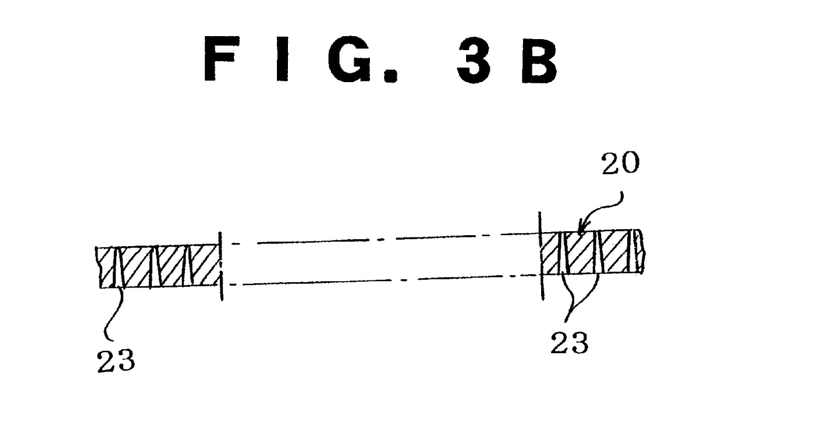
FIG. 3B is a vertical sectional view taken along line IIIB—IIIB of FIG. 3A.

FIGS. 3A and 3B show the latter airbag apparatus for a front passenger seat.

FIG. 3A is an enlarged partial view of the airbag apparatus in which a fragile contour portion 21a and a fragile center splitting portion 21b are formed in a single-layer interior cover 20 along a fracture line 21. FIG. 3B is a cross-sectional view taken along line IIIB—IIIB in FIG. 3A.

The contour portion 21a and the center splitting portion 21b are formed on the interior cover 20 by means of a laser. Specifically, a pulsating laser beam from a laser is applied to the interior cover 20 from behind while being moved relatively along the outline edges of reinforcement plate members 25a fixed to the back surface of the interior cover 20. Thus, perforations 23 are formed in the interior cover 20 along the fracture line 21 to thereby form the contour portion 21a, which has a size corresponding to the size of an opening portion 22a of an airbag case 22. Similarly, the center splitting portion 21b is formed. Upon inflation of an airbag 26, the contour portion 21a and the center splitting portion 21b are broken. As a result, the fracture-opening section is split into front and rear subsections 27a and 27b, which are then turned inside out. Subsequently, the inflating airbag 26 projects outward from the interior cover 20 through the thus-formed opening, and protects the passenger from the impact force of collision.

The thus-configured automobile airbag apparatus functions in the following manner. Upon collision of the vehicle, an impact force caused by the collision is detected by a sensor. A control unit including a CPU judges whether or not the detected impact force is equal to or higher than a predetermined value. When the control unit judges that the impact force is not lower than the predetermined value, the control unit issues a signal for causing the inflater to generate a predetermined gas. The gas is fed to the airbag so as to promptly inflate the airbag.

In the conventional airbag apparatus for a front passenger seat shown in FIG. 1, the opening portion 10b is formed in the interior cover 10 in such a manner as to face the opening portion 12a of the airbag case 12. The opening lid 13 is a discrete element different from the interior cover 10 and made of a flexible resin material and is fitted into the opening portion 10b. Thus, the manufacture and assembly work of the interior cover 10 and the opening lid 13 are rather complicated. Also, when an external force is applied to the opening lid 13, the opening lid 13 easily deforms when an external force is applied thereto, with possible breakage of the groove 13a formed at the center of opening lid 13, thereby damaging the appearance or design of the interior cover 10.

Also, in the case of the airbag apparatus for a front passenger seat shown in FIGS. 3A and 3B, the perforations 23 for the contour portion 21a and the center splitting portion 21b are formed on the interior cover 20 through laser processing. Therefore, the perforations 23 perpendicularly penetrate the interior cover 20 from the back surface to the front surface thereof.

As a result, the contour portion 21a and the center splitting portion 21b are weak against an external pressure (load). Therefore, if a passenger accidentally places his/her hand or arm on the fracture-opening section, the center splitting portion 21b may break and subside easily.

Further, since the perforations 23 perpendicularly penetrate the interior cover 20 from the back surface to the front surface thereof, upon breakage of the fracture-opening section, the contour portion 21a and the center splitting portion 21b form a saw-blade-like cut surface along the fracture line 21. As a result, sharp edges are formed on the wall surface of the opening, which is undesirable from the viewpoint of safety.

SUMMARY OF THE INVENTION

An object of the present invention is to solve the above-mentioned problems in the existing airbag apparatus for a front passenger seat and to provide an airbag apparatus for a front passenger seat which has reinforcement means for enabling a fracture-opening section to sustain external pressure and which provides improved appearance and safety.

In order to achieve the above-object, the present invention provides an airbag apparatus for a front passenger seat built in an instrument panel of a vehicle. The airbag apparatus comprises an airbag case accommodated within a core of the instrument panel and having an opening portion located in opposition to a back surface of a cover of the instrument panel; an airbag accommodated within the airbag case in a folded state, the airbag being able to be inflated by means of gas from an inflater; a fracture-opening section defined in the cover to be located in opposition to the opening portion of the airbag case, the fracture-opening section having a fragile contour portion surrounding the fracture-opening section and a fragile center splitting portion for dividing the fracture-opening section into front and rear subsections; front and rear reinforcement plate members fixedly attached to back surfaces of the front and rear subsections, each of the front and rear reinforcement plate members being connected to the opening portion of the airbag case via a hinge portion; and reinforcement means provided at mutually-opposed end portions of the front and rear reinforcement plate members and adapted to reinforce the center splitting portion.

The airbag apparatus of the present invention can be manufactured easily. Further, the fracture-opening section can be fractured reliably along the contour portion and the center splitting portion. Since the center splitting portion can sustain external pressure applied onto the upper surface of the interior cover, the fracture-opening section does not deform or subside. Therefore, the airbag apparatus of the present invention provide an improved appearance and safety.

Further, since the front and rear subsections of the fracture-opening section are connected reliably by the reinforcement plate members before being separated from the interior cover along the contour portion and the center splitting portion upon expansion of the airbag, the front and rear subsections do not scatter, and no sharp edges are formed on the wall surface of the opening extending along the fracture line.

BRIEF DESCRIPTION OF THE DRAWINGS

FIGS. 3A and 3B show a main portion of an existing airbag apparatus for a front passenger seat, wherein

DESCRIPTION OF THE PREFERRED EMBODIMENT

An embodiment of the present invention will next be described in detail with reference to the drawings.

In the present specification, the terms "front" and "rear" correspond to the front and rear, respectively, of a vehicle, and the terms "right" and "left" correspond to the right-hand and left-hand sides, respectively, of the vehicle.

Figure 4:
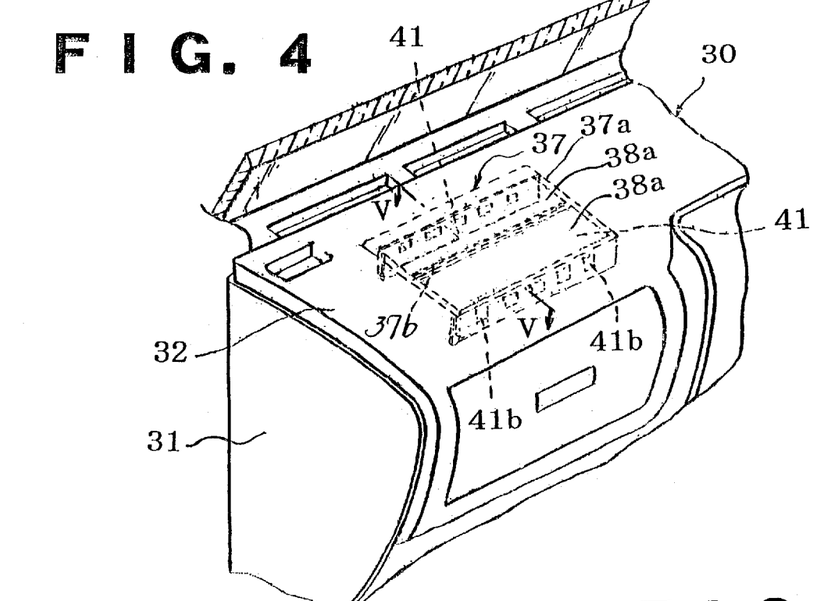
FIG. 4 is a perspective view of a main portion of an interior cover equipped with an airbag apparatus for a front passenger seat according to an embodiment of the present invention.
Figure 5:
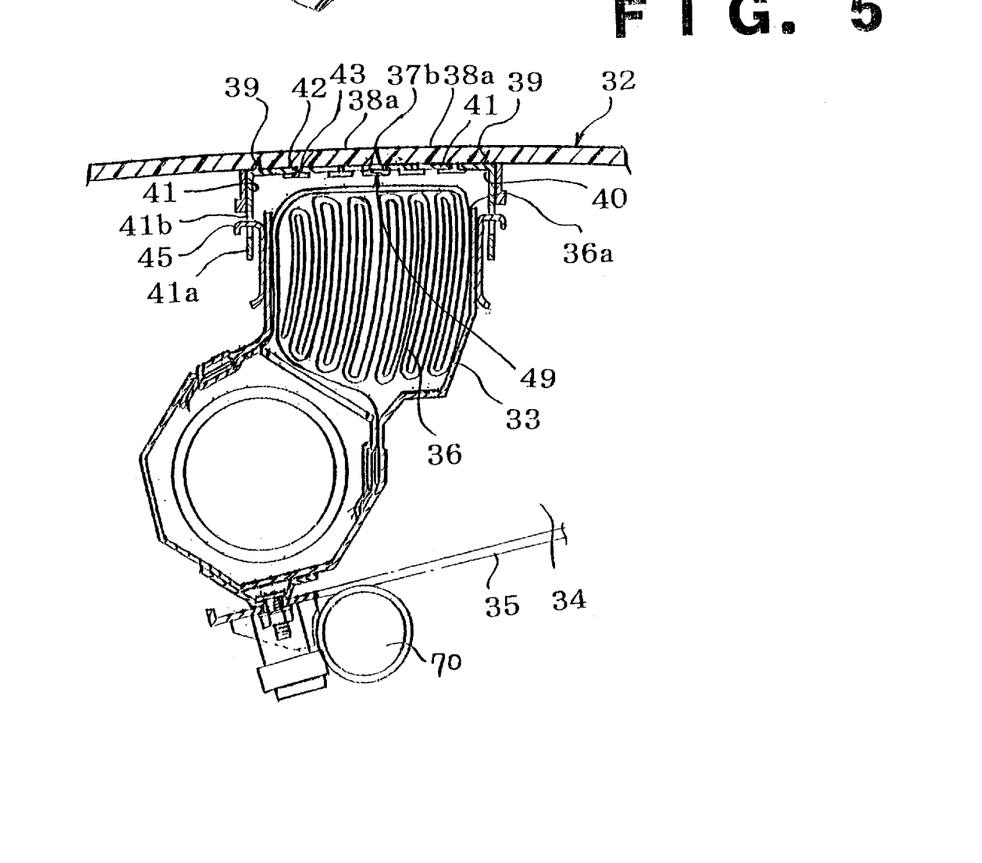
FIG. 5 is a vertical sectional view of the airbag apparatus of the embodiment taken along line V—V of FIG. 4.

As shown in FIGS. 4 and 5, an instrument panel 30 includes an instrument panel core 31 and an interior cover 32, which covers the instrument panel core 31. The instrument panel core 31 and the interior cover 32 are each molded from a synthetic resin, such as polypropylene. The interior cover 32 is fixedly attached, by appropriate means, such as tapping screws, to the instrument panel core 31, which, in turn, is fixedly attached to a frame (not shown) of a vehicle.

As shown in FIG. 5, an accommodation section 34 for accommodating a metallic airbag case 33 is defined by means of a partition 35 behind the interior cover 32 and located in opposition to a front seat passenger seat. The present embodiment is applied to a right-hand drive vehicle. A left-hand drive vehicle employs a mirror image of the configuration of the present embodiment.

The partition 35 is removably attached to the interior cover 32 using a plurality of tapping screws in order to facilitate disposition of the airbag case 33 and other elements under the interior cover 32.

A fracture-opening section, which is split open upon inflation of an airbag 36, is formed on the interior cover 32 in opposition to the accommodation section 34. The fracture-opening section assumes a substantially rectangular shape and an area substantially equal to that of an opening portion 36a of the airbag case 33. The fracture-opening section is defined by a fragile counter portion 37a extending along a fracture line 37. The fracture-opening section can be split into two pieces or subsections 38a along a fragile center splitting portion 37b. Each of the counter portion 37a and the center splitting portion 37b includes fragile portions formed through laser processing, which will be described later.

The airbag 36 is accommodated in a folded condition within the airbag case 33. The airbag 36 is connected to an inflater (not shown) disposed outside the partition 35, by means of a gas feed pipe 70.

The contour portion 37a is formed by means of a laser. Specifically, a pulsating laser beam (output: 3 kW to 5 kW) of a predetermined frequency (e.g., 7 kHz) output from a laser is applied to the interior cover 32 from behind while being moved relatively at a predetermined speed along the fracture line 37, so that perforations 39 serving as fragile portions are formed along the fracture line 37. The center contour portion 37a is formed in the same manner.

Front and rear reinforcement plate members 41 are fixed to the back surfaces of the subsections 38a of the fracture-opening section. Each of the reinforcement plate members 41 is connected to the opening portion 36a of the airbag case 33 via a hinge portion 40. Upon inflation of the airbag 36, the fracture-opening section separates from the interior cover 32 along the contour portion 37a and splits into the front and rear subsections 38a along the center splitting portion 37b, so that the front and rear subsections 38a are turned inside out about the hinge portions 40 of the reinforcement plate members 41 in opposite directions.

Figure 6:
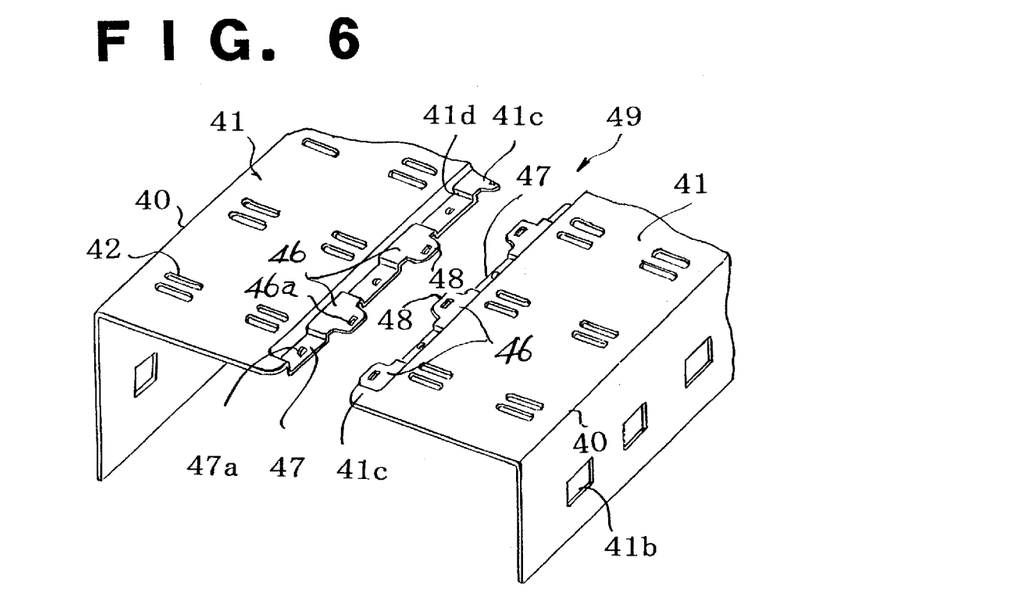
FIG. 6 is a perspective view of reinforcement plate members of the airbag apparatus of the embodiment.

Further, blocks of coupling holes 42 are formed on each of the reinforcement plate members 41 while being arranged in the transverse and longitudinal directions of the reinforcement plate member 41 over the entire area thereof. Each block includes a plurality of coupling holes 42 extending in the transverse direction of the reinforcement plate member 41 and arranged close to one another in the transverse and longitudinal directions of the reinforcement plate member 41. A plurality of elongated protrusions 43 are formed on the inner surfaces of the front and rear subsections 38a of the fracture-opening section in such a manner as to be aligned with the coupling holes 42 formed in the reinforcement plate members 41. The elongated protrusions 43 are engaged with the corresponding coupling holes 42, and the projecting tip ends of the protrusions 43 are melted through application of heat, such that the tip ends are flattened. Thus, the front and rear reinforcement plate members 41 are fixedly attached to the front and rear subsections 38a. Reference numeral 45 denotes hooks whose base ends are fixed to the side surfaces of the airbag case 33 extending in the longitudinal direction (right/left direction) of the airbag case 33. The hooks 45 are engaged with openings 41b, which are formed in bent portions 41a of the reinforcement plate members 41 at predetermined intervals in the longitudinal direction (right/left direction).

Figure 7:
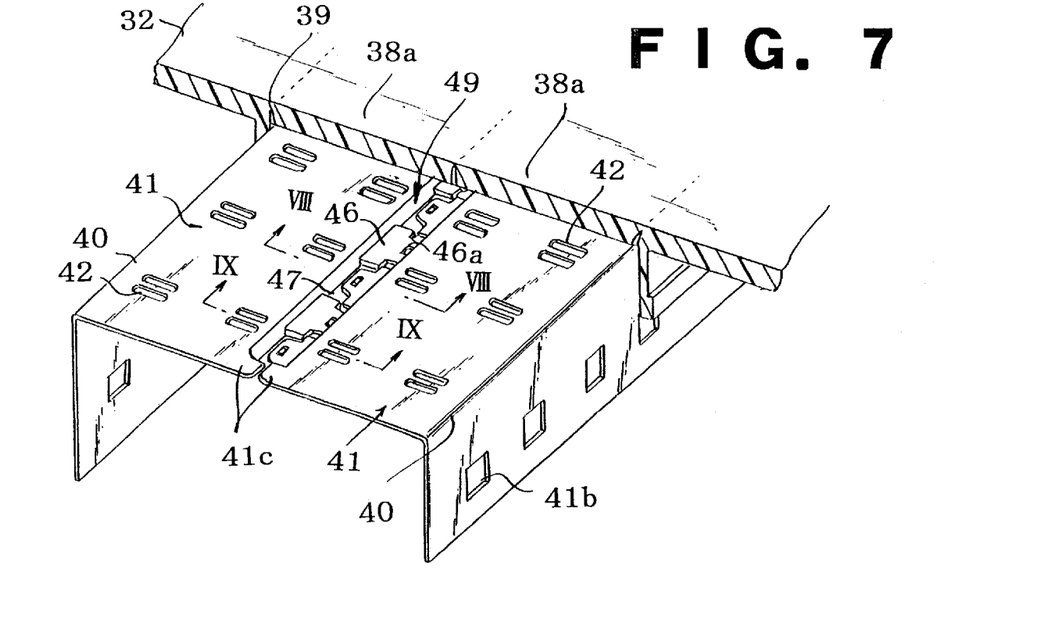
FIG. 7 is a perspective view of the reinforcement plate members while attached to the fracture-opening section.
Figure 8:
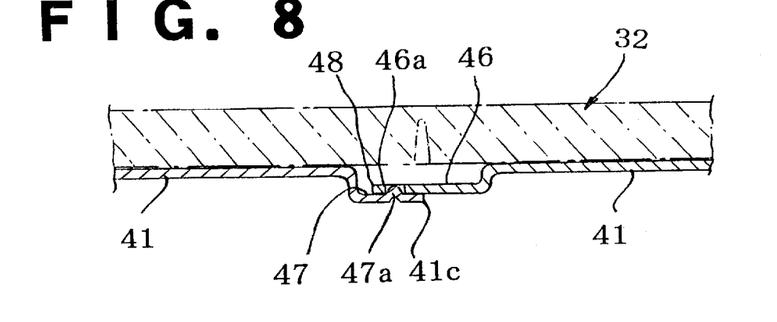
FIG. 8 is a sectional view taken along line VIII—VIII of FIG. 7.
Figure 9:
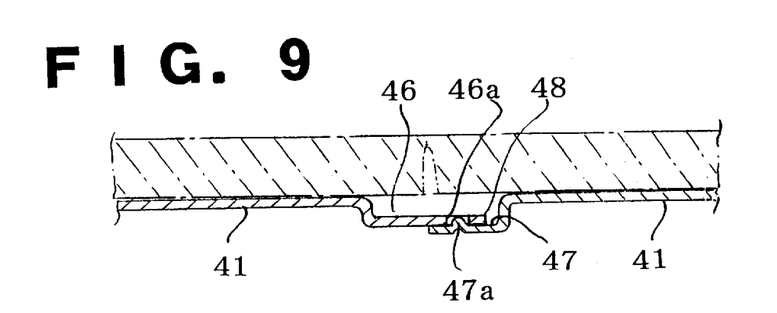
FIG. 9 is a sectional view taken along line IX—IX of FIG. 7.

Moreover, as shown in FIG. 6, as reinforcement means 49, upper bent portions 46 and lower bent portions 47 are alternately formed at predetermined intervals at each of mutually-opposed end portions (hereinafter referred to as "facing end portions") 41c of the front and rear reinforcement plate members 41 such that a vertical step 41d is formed between the upper bent portions 46 and the lower bent portions 47. A projection tongue 48 having an engagement hole 46a is provided at the tip end of each upper bent portion 46. A projection 47a engageable with the engagement hole 46a is formed on the upper face of each lower bent portion 47. As shown in FIGS. 7 to 9, the facing end portions 41c of the front and rear reinforcement plate members 41 are superposed and engaged with each other such that the projection tongues 48 are located above the lower bent portions 47.

The thus-configured airbag apparatus for a front passenger seat according to the present embodiment of the present invention functions in the following manner. Upon collision of the vehicle, an impact force caused by the collision is detected by a sensor. A control unit including a CPU judges whether or not the detected impact force is equal to or higher than a predetermined value. When the control unit judges that the impact force is not lower than the predetermined value, the control unit issues a signal for causing the inflater to generate a predetermined gas. The gas is fed to the airbag 36 so as to promptly inflate the airbag 36.

The inflating airbag 36 presses, from inside, the fracture-opening section of the interior cover 32. As a result, the front and rear subsections 38a of the fracture-opening section are fractured along the contour portion 37a and the center splitting portion 37b and detached from the interior cover 32. The detached front and rear subsections 38a are opened outward while being turned inside out about the hinge portions 40 of the reinforcement plate members 41.

The inflating airbag 36 projects outward from the interior cover 32 through the thus-formed opening in the interior cover 32. Serving as a cushion, the inflated airbag 36 supports a front seat passenger at his/her chest and head, thereby protecting the passenger from the impact force of collision.

In the airbag apparatus according to the present invention, the reinforcement means 49 (i.e., the engagement holes 46a of the projection tongues 48 of the upper bent portions 46 and the projections 47a formed on the upper faces of the lower bent portions 47) provided at the facing end portions 41c of the front and rear reinforcement plate members 41 are superposed and engaged with each other. Therefore, a force for resisting external pressure is produced at the superposed and engaged position, so that there can be avoided problems such as the problem of the fragile portions of the center splitting portion 37b being broken by external pressure.

The phenomenon that occurs at the superposed and engaged position resembles a state in which fingers of right and left hands are engaged together in such a manner that the fingers of the right and left hands are interlocked, in which a large resisting force is generated against pressing force applied to the back of the left or right hand, and a small resisting force is generated against pressing force applied to the palm of the left or right hand. Therefore, when the airbag expands outwards, the reinforcement means does not hinder the expansion, so that the airbag can expands smoothly at the time of emergency.

Further, since the perforations constituting the contour portion 37a and the center splitting portion 37b do not appear on the horizontal surface of the interior cover 32, the interior cover 32 has an improved appearance. In addition, the interior cover 32 can be broken reliably and quickly along the contour portion 37a and the center splitting portion 37b upon expansion of the airbag 36.

Figure 10:
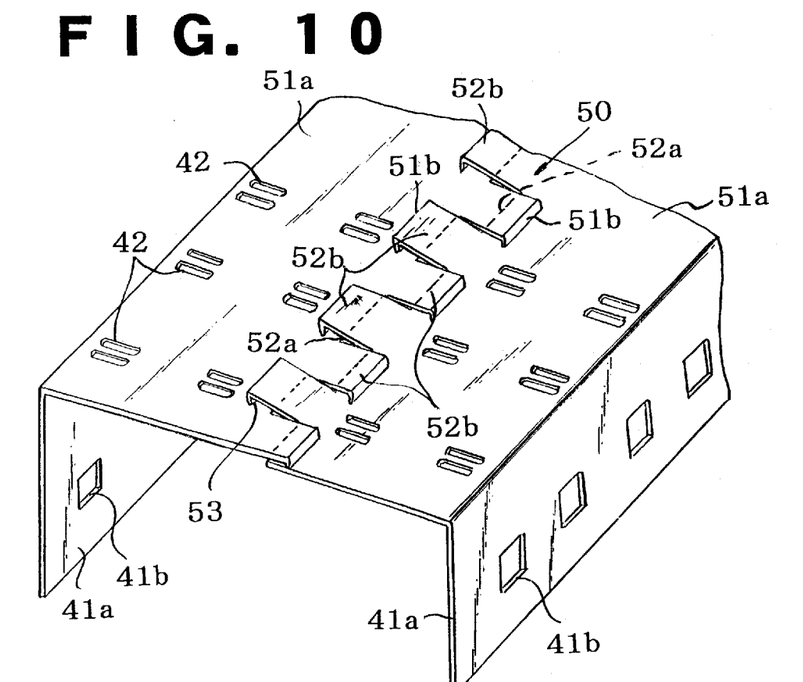
FIG. 10 is a perspective view showing a first modification of the reinforcement plate members of the airbag apparatus of the embodiment.

FIG. 10 shows a first modification of the reinforcement plate members of the airbag apparatus of the embodiment. In this modification, as reinforcement means 50, engagement projections 52a and engagement cutaways 52b are alternately formed at predetermined intervals at each of the facing end portions 51b of the front and rear reinforcement plate members 51a. The facing end portions 51b of the front and rear reinforcement plate members 51a are engaged together in such a manner that the engagement projections 52b formed at one facing end portion 51b enter the engagement cutaways 52a formed at the other facing end portion 51b. Moreover, claws 53 downwardly extend from the tip ends of the engagement projections 52b, so that a further enhanced reinforcement effect is expected.

Since other portions are the same as those of the above-described embodiments, the same portions are denoted by the same reference numerals, and their repeated description is omitted.

Figure 11:
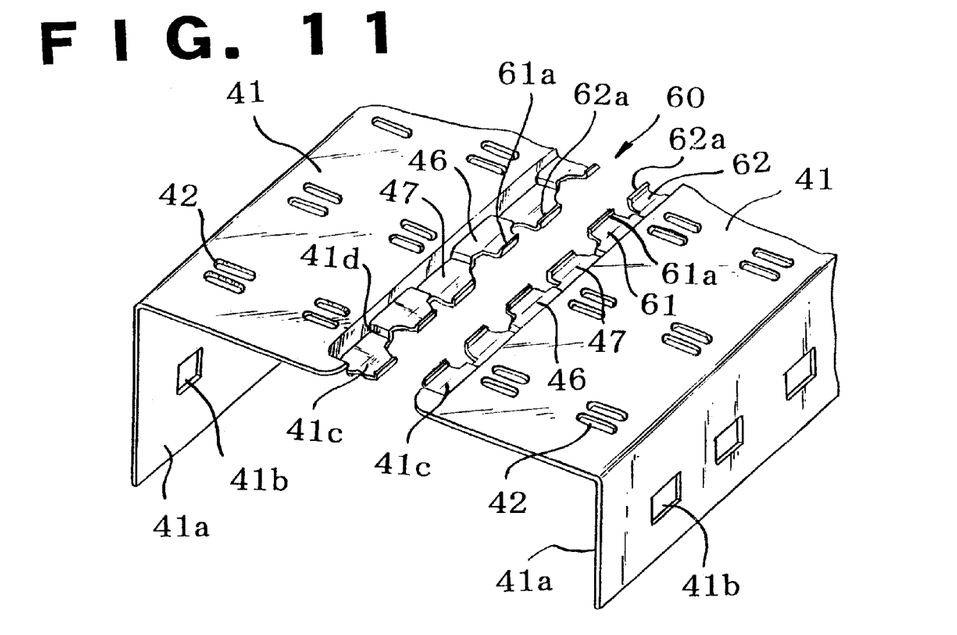
FIG. 11 is a perspective view showing a second modification of the reinforcement plate members of the airbag apparatus of the embodiment.
Figure 12:
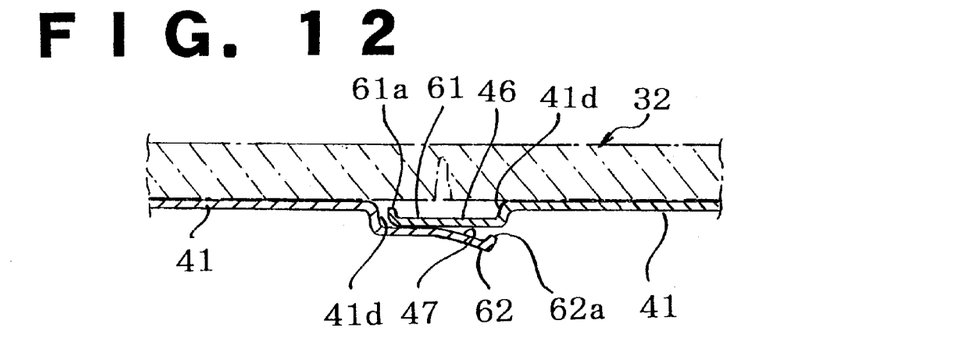
FIG. 12 is a sectional view corresponding to FIG. 8 and showing the second modification.
Figure 13:
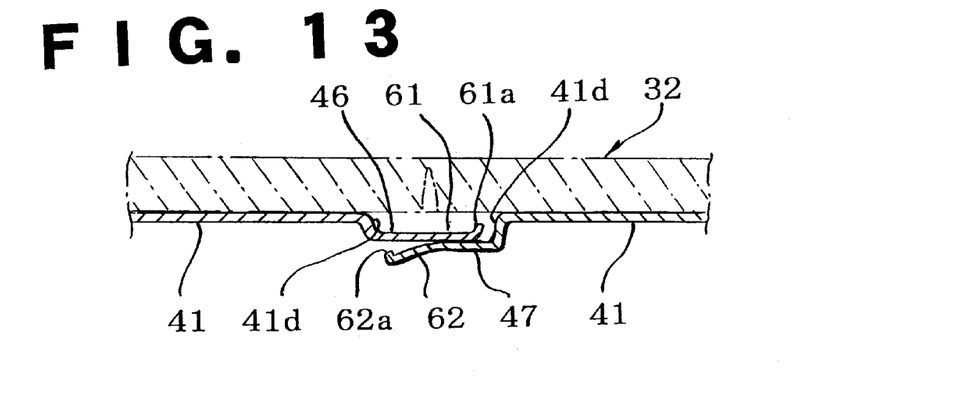
FIG. 13 is a sectional view corresponding to FIG. 9 and showing the second modification.

FIGS. 11 to 13 show a second modification of the reinforcement plate members of the airbag apparatus of the embodiment. Reinforcement means 60 employed in the present modification has a configuration similar to that employed in the above-described embodiment. Therefore, the same portions are denoted by the same reference numerals, and different portions will mainly be described. As the reinforcement means 60, upper bent portions 46 and lower bent portions 47 are alternately formed at predetermined intervals at each of the facing end portions 41c of the front and rear reinforcement plate members 41 such that a vertical step 41d is formed between the upper bent portions 46 and the lower bent portions 47. A projection tongue 61 is provided at the tip end of each upper bent portion 46, and the tip end portion of the projection tongue 61 is bent upward to thereby form a protrusion 61a. Similarly, a projection tongue 62 is provided at the tip end of each lower bent portion 47, and the tip end portion of the projection tongue 62 is bent upward to thereby form a protrusion 62a. Moreover, the tip end portion of each lower bent portion 47 is slightly curved downward. When the front and rear reinforcement plate members 41 are engaged together for installation, the facing end portions 41c of the front and rear reinforcement plate members 41 are superposed and engaged together in such a manner that the projection tongues 61 formed at the tip ends of the upper bent portions 46 are located above the lower bent portions 47 and that the projection tongues 62 of the lower bent portions 47 slightly curved downward separate from the back surfaces of the projection tongues 61 of the upper bent portions 46.

The protrusions 61a and 62a are preferably formed through a process of bending upward the tip end portions of the projection tongues 61 and 62. However, the method of forming the protrusions 61a and 62a is not limited thereto. For example, the protrusions 61a and 62a may be fabricated as separate parts, which are subsequently fixed to the tip end portions of the projection tongues 61 and 62 through welding or any other suitable means.

In the second modification, the facing end portions 41c of the front and rear reinforcement plate members 41 overlap over a larger distance as compared with the above-described embodiment. Therefore, even when a pressing force (external pressure) is accidentally applied to the center splitting portion of the interior cover and the fragile portions are broken, due to the large overlap of the facing end portions 41c, the superposed portions do not disengage and separate completely, which would otherwise result in subsidence. The superposed portions elastically return to the original positions to thereby close the clearance at the center splitting portion, whereby subsidence of the center splitting portion of the interior cover is prevented.

Moreover, the tip end portion of each lower bent portion 47 is slightly curved downward, and the front and rear reinforcement plate members 41 are engaged together for installation in such a manner that the projection tongues 62 of the lower bent portions 47 separate from the back surfaces of the projection tongues 61 of the upper bent portions 46. Therefore, when the airbag apparatus operates, the reinforcement plate members 41 are smoothly expanded together with the airbag. Further, since the front and rear subsections of the fracture-opening section are connected reliably by the reinforcement plate members before being separated from the interior cover along the contour portion and the center splitting portion, the front and rear subsections do not scatter, and no sharp edges are formed on the wall surface of the opening extending along the fracture line.

What is claimed is:

1. An airbag apparatus for a front passenger seat built in an instrument panel of a vehicle, comprising:

an airbag case accommodated within a core of said instrument panel and having an opening portion located in opposition to a back surface of an interior cover covering said core;

an airbag accommodated within said airbag case in a folded state, said airbag being able to be inflated by means of gas from an inflater;

a fracture-opening section defined in said cover to be located in opposition to the opening portion of said airbag case, said fracture-opening section having a fragile contour portion surrounding said fracture-opening section and a fragile center splitting portion for dividing said fracture-opening section into front and rear subsections, front and rear reinforcement plate members fixedly attached to back surfaces of said front and rear subsections, each of said front and rear reinforcement plate members being connected to the opening portion of said airbag case via a hinge portion; and reinforcement means provided at mutually-opposed end portions of said front and rear reinforcement plate members and adapted to reinforce the center splitting portion, wherein said reinforcement means comprises engagement projections and engagement cutaways alternately formed at each of the mutually-opposed end portions of said front and rear reinforcement plate members, wherein the mutually-opposed end portions of said front and rear reinforcement plate members are superposed and engage with each other in such a manner that said engagement projections formed at one of the mutually-opposed end portions enter said engagement cutaways formed at the other of said mutually-opposed end portions.

2. An airbag apparatus for a front passenger seat built in an instrument panel of a vehicle, comprising:

an airbag case accommodated within a core of said instrument panel and having an opening portion located in opposition to a back surface of an interior cover covering said core;

an airbag accommodated within said airbag case in a folded state, said airbag being able to be inflated by means of gas from an inflater;

a fracture-opening section defined in said cover to be located in opposition to the opening portion of said airbag case, said fracture-opening section having a fragile contour portion surrounding said fracture-opening section and a fragile center splitting portion for dividing said fracture-opening section into front and rear subsections;

front and rear reinforcement plate members fixedly attached to back surfaces of said front and rear subsections, each of said front and rear reinforcement plate members being connected to the opening portion of said airbag case via a hinge portion; and reinforcement means provided at mutually-opposed end portions of said front and rear reinforcement plate members and adapted to reinforce the center splitting portion, wherein said reinforcement means comprises upper bent portions and lower bent portions alternately formed at predetermined intervals at each of the mutually-opposed end portions of said front and rear reinforcement plate members such that a vertical step is formed between said upper and lower bent portions; a projection tongue having an engagement hole is provided at the tip end of each upper bent portion; and a projection engageable with the engagement hole is formed on an upper face of each lower bent portion, wherein the mutually-opposed end portions of said front and rear reinforcement plate members are superposed and engage with each other in such a manner that said projection tongues are located above said lower bent portions.

3. An airbag apparatus for a front passenger seat built in an instrument panel of a vehicle, comprising:

an airbag case accommodated within a core of said instrument panel and having an opening portion located in opposition to a back surface of an interior cover covering said core;

an airbag accommodated within said airbag case in a folded state, said airbag being able to be inflated by means of gas from an inflater;

a fracture-opening section defined in said cover to be located in opposition to the opening portion of said airbag case, said fracture-opening section having a fragile contour portion surrounding said fracture-opening section and a fragile center splitting portion for dividing said fracture-opening section into front and rear subsections:

front and rear reinforcement plate members fixedly attached to back surfaces of said front and rear subsections, each of said front and rear reinforcement plate members being connected to the opening portion of said airbag case via a hinge portion, and reinforcement means provided at mutually-opposed end portions of said front and rear reinforcement plate members and adapted to reinforce the center splitting portion, wherein said reinforcement means comprises upper bent portions and lower bent portions alternately formed at predetermined intervals at each of the mutually-opposed end portions of said front and rear reinforcement plate members such that a vertical step is formed between said upper and lower bent portions; a projection tongue is provided at the tip end of each of said upper and lower bent portions, said projection tongue having a protrusion extending upward from a tip end portion of said projection tongue; the tip end portion of each lower bent portion is slightly curved downward, wherein the mutually-opposed end portions of said front and rear reinforcement plate members are superposed and engage with each other in such a manner that said projection tongues formed at the tip ends of said upper bent portions are located above said lower bent portions and that only the tip end portions of said lower bent portions separate from back surfaces of said projection tongues of said upper bent portions.

\* \* \* \* \*